March 19, 1968  K. PRAGER  3,373,538
STRUCTURAL ELEMENT

Filed Feb. 9, 1966  2 Sheets-Sheet 2

INVENTOR.
Karel Prager
BY
Michael J. Striker

United States Patent Office 3,373,538
Patented Mar. 19, 1968

3,373,538
STRUCTURAL ELEMENT
Karel Prager, Prague, Czechoslovakia, assignor to Sklo Union narodni podnik, Teplice, Czechoslovakia
Filed Feb. 9, 1966, Ser. No. 526,152
Claims priority, application Czechoslovakia, Feb. 17, 1965, 1,077/65
9 Claims. (Cl. 52—403)

ABSTRACT OF THE DISCLOSURE

A structural element comprising a pair of spaced, substantially parallel sheets of frangible material each having an elongated edge portion extending in direction toward the other panel; and connecting means releasably connecting said sheet members to one another, said connecting means including an elongated strip member of elastic material provided with longitudinally extending channels which are complementary to the edge portions of said sheets and in which said edge portions are received whereby said sheets are releasably connected and maintained in spaced position with reference to one another.

---

The present invention relates to a structural element. More specifically, the invention relates to a structural element of a type comprising twin glass panes which are disposed spaced from one another so as to leave a free space therebetween. Still more specifically, the invention relates to an element of the type outlined above which is particularly useful in the construction of interior and exterior building walls.

It is of course known to utilize single or double glass panes in interior and exterior building walls. However, heretofore such panes have been maintained in their predetermined positions by the use of metallic or wooden frames and/or auxiliary supports. Such frames as well as the auxiliary supports cover a not negligible part of the glass panes; if used between two panes and in contact with both, they may in many cases constitute acoustic and thermal bridges; and the construction of frames and the auxiliary supports, their assembly to the glass panes, and the installation of the completed structural element all are very expensive.

It is therefore an object of the present invention to overcome these drawbacks of prior-art constructions.

A more specific object of the present invention is to provide a structural element which is suitable for use in interior and exterior walls of buildings.

Still a more specific object of invention is to provide a structure of the type outlined above which is suitable for use with two spaced panes of glass which will generally be parallel with one another.

A concomitant object of the invention is to provide such a structure in which only relatively small portions of the surface area of the glass panes are covered, wherein the means for maintaining the glass panes in their positions will not form acoustic bridges, and in which no thermal transfer can take place from one pane to the other via the intermediary of such means used to maintain the two panes.

An additional object of the invention is to provide such a structure which is inexpensive to construct and to install.

In accordance with one feature of the invention I provide a structural element which comprises a pair of spaced, substantially parallel sheet members of frangible material. Each of these sheet members has an elongated edge portion extending in direction toward the other panel. Further I provide connecting means which connect the sheet members to one another, and such connecting means may include an elongated strip member of elastic material which is provided with longitudinally extending channels complementary to the edge portions of said sheet members and in which the edge portions are received. Thereby, the sheet members are maintained in spaced position with reference to one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
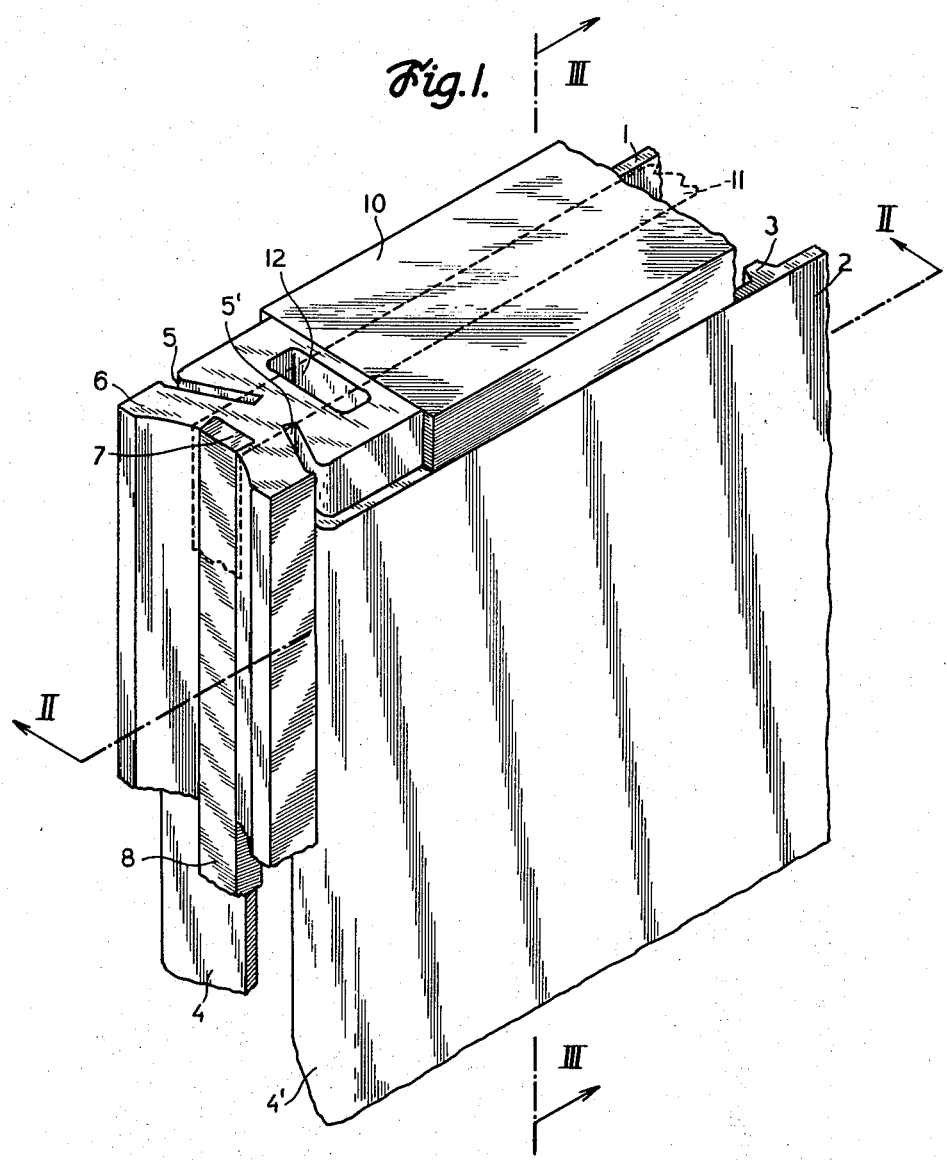
FIG. 1 is a somewhat diagrammatic axonometric view of an embodiment of the invention.
Figure 2:
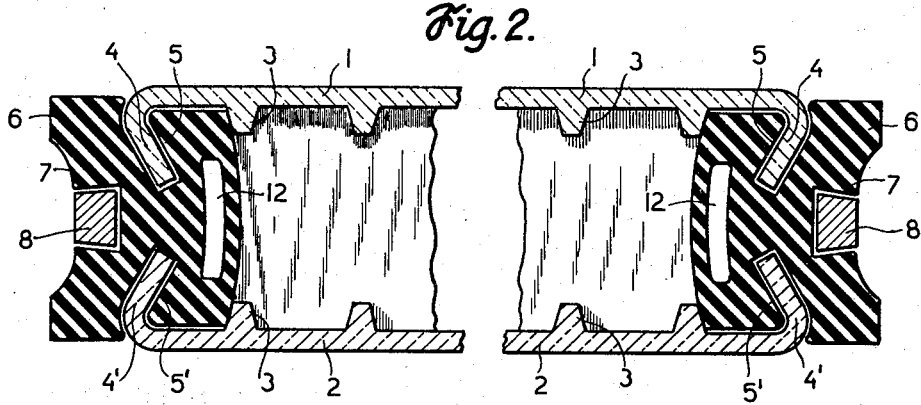
FIG. 2 is a horizontal sectional view taken through the embodiment of FIG. 1 on the line II—II thereof.

Discussing now the drawing in detail, and firstly FIG. 1 thereof, it will be seen that there are provided two panes or sheets 1 and 2 of frangible material which, in the embodiment shown, will be supposed to be glass. The outwardly directed faces of these panes 1 and 2 may be provided with a pattern of any desired sort and this is mentioned here only for purposes of illustration as it does not constitute part of the invention.

The inwardly directed faces of the panes 1 and 2 are provided with ribs 3. The two edge portions 4, 4' of the panes 1, 2 are bent so as to form an acute angle with respect to the major surfaces of the panes 1 and 2. It will be seen from the drawing that the edge portions 4, 4' are located oppositely one another and are extending towards one another across the space which is defined between the panes 1 and 2.

The inwardly-bent edge portions 4, 4' are received in grooves or cutouts 5, 5' provided in strip-like connecting members 6 of elastic material, only one of these being shown since it will be understood that the member 6 joining the corresponding edge portions at the other side of the panes 1 and 2 will be identical. The cutouts 5, 5' are arranged at the same angle with respect to the lateral faces of the members 6 as that which the edge portions 4, 4' define with the major surfaces of the panes 1, 2.

Portions of the members 6 are thus received intermediate the panes 1, 2 and it will be seen that such portions may be somewhat compressed between the edge portions 4, 4' and the closest ribs 3.

In their outwardly directed peripheral faces the connecting members 6 are provided with dove-tail grooves 7 into which reinforcement members in form of wedges 8 may be inserted after the connecting members 6 are secured to the plates 1, 2. This is desirable because of the elastic nature of the material from which the connecting members 6 are made.

Figure 3:
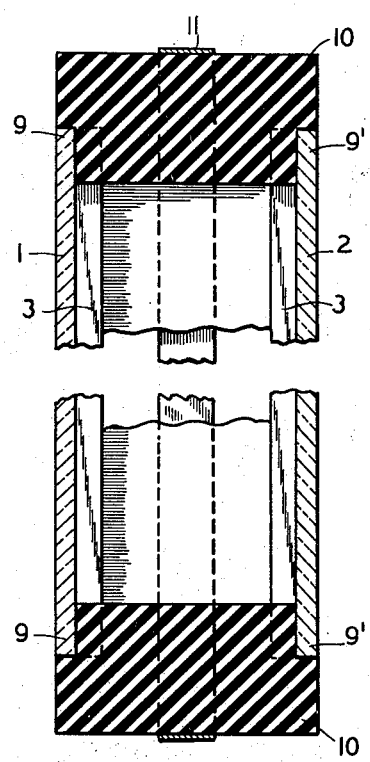
FIG. 3 is a vertical sectional view taken on the line III—III of FIG. 3.

Sealing members 10, which are provided on the sides of the panes 1, 2 which are not joined by the connecting members 6 and which may also be made of elastic material, are arranged so as to be at least partially received intermediate the respective associated edge portions 9, 9' of the panes 1 and 2. As will be seen from the drawing, particularly from FIG. 3 thereof, the sealing members 10 may be somewhat T-shaped such that one longitudinally extending portion thereof has a width corresponding to the distance intermediate the respective outer faces of the panes 1 and 2, whereas another portion, namely that which is received intermediate the edge portions of the panes, is only of a width corresponding to the distance intermediate the inner faces of the panes 1 and 2. Thus, the portion whose width corresponds to the distance intermediate the outer faces of the panes will rest with its overhanging sections on the edges of the panes 1 and 2. These sealing members 10 may be secured to the panes 1 and 2 and, indeed, to the connecting members 6, by various means such as adhesives. If the novel arrangement is used with very large panes of frangible material it has been found advantageous to place about the periphery of the completed structural element a strapping band, such as a steel strip 11 (indicated in FIG. 1 in phantom lines) which serves to further maintain all members in their proper respective positions. As is evident from FIG. 1, such strapping band 11 would overlie the reinforcing wedges 8 received in the dovetail grooves 7 of the connecting members 6.

The cavity which is defined between the panes 1 and 2 may be filled with insulating material if such is desirable. For this it will be particularly advantageous, of course, if the material of the panes is not transparent. However, instead of the insulating material it is also possible to dispose suitable lighting means in the cavity or, as another possibility, to suitably paint the inner surfaces of the panes. Furthermore, a structural element in accordance with the present invention may also be made to produce an effect of luminescence by lighting the edges of the panes 1 and 2 if the same are of glass.

It will be understood that the connecting member 6 and the sealing members 10 of elastic material not only serve to unite the panes 1 and 2 into a structural element, but that they also have further useful functions. For example, the members 6 and 10 protect the finished structural element from damage by edge-wise shocks or blows during transport and assembly into the wall into which they are to be incorporated. Furthermore, a structural unit of this type is in effect elastically suspended inside the space assigned it in the wall structure since it rests on the elastic material of members 6 and 10. Variations in tolerance of the space provided in the wall structure can be overcome by simply cutting the borders of the members 6 and 10 to shape if the elasticity of the members 6 and 10 is not sufficient in itself to compensate for such variations. Furthermore, it is possible to dispose electric conductors within the members 6 without having to insulate them, if the material of the members 6 is selected so as to have insulating properties of its own. For this purpose the members 6 are provided with throughgoing channels 12 extending lengthwise or in another desired direction and, of course, the members 10 may be similarly constructed.

The structural elements in acordance with the present invention are highly useful for a variety of purposes and can be used as fixed partition walls, as transparent, translucent or opaque structural elements. Such elements can also be made to serve as doors, in which case one of the the members 6 must be either replaced or provided intermediate its longitudinally spaced ends with a slot, or modified in a similar manner, and a plate of suitable material, such as hardened glass, can then be made to slide through this slot into the cavity between the panes 1 and 2, such plate serving as the door. Furthermore, it is possible to construct even rotatable louvre-type walls and slidable folding walls from structural elements made in accordance with the present invention.

It will be understood that each of the elements described above, or two or more together, may also find a useful application in other types of structural elements differing from the types described above.

While the invention has been illustrated and described as embodied in a twin-pane structural element, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of the invention and, therefore, such adaptations should and are intended to be comprehended within the meaning and range of equivalence of the following claims.

What is claimed as new and desired to be secured by Letters Patent is:

1. A structural element comprising a pair of spaced, substantially parallal sheets of frangible material each having an elongated edge portion extending in direction toward the other panel; and connecting means releasably connecting said sheet members to one another, said connecting means including an elongated strip member of elastic material provided with longitudinally extending channels which are complementary to the edge portions of said sheets and in which said edge portions are received whereby said sheets are releasably connected and maintained in spaced position with reference to one another.

2. An element as defined in claim 1, wherein said sheets are of polygonal configuration and have integral marginal portions extending at an angle to and meeting said elongated edge portions, the marginal edge portion of one of said sheets being juxtaposed with corresponding marginal edge portions of the other of said sheets.

3. An element as defined in claim 2; and further comprising elongated sealing members of elastic material sealingly received between respective juxtaposed ones of said marginal portions.

4. An element as defined in claim 3, wherein each of said sheets is provided with a further elongated edge portion spaced from the first-mentioned one, wherein said connecting means includes a further elongated strip member of elastic material provided with longitudinally extending grooves in which said further edge portions are received, and wherein said sealing members extend longitudinally from said first-mentioned to said further elongated strip member.

5. An element as defined in claim 4, wherein said strip members are provided in outwardly directed faces thereof with longitudinally extending dove-tail grooves; and further comprising reinforcing elements of complementary configuration received in said dove-tail grooves.

6. An element as defined in claim 4, wherein at least some of said members are made of electrically insulating material and provided with throughgoing channels adapted to receive electrical conductors.

7. An element as defined in claim 4, wherein said sealing members are bonded to said strip members.

8. A structural element comprising a pair of spaced, substantially parallel sheets of frangible material of polygonal configuration and each having an elongated edge portion extending in direction toward the other panel and marginal portions extending at an angle to and meeting said elongated edge portions, the marginal edge portion of one of said sheets being juxtaposed with corresponding marginal edge portions of the other of said sheets, and a further elongated edge portion spaced from the first-mentioned elongated edge portion; connecting means connecting said sheet members to one another and including an elongated strip member of elastic material provided with longitudinally extending channels which are complementary to said sheets and in which said edge portions are received, and a further elongated strip member of elastic material provided with longitudinally extending grooves in which said further edge portions are received, whereby said sheets are maintained in spaced position with reference to one another; and elongated sealing members of elastic material received between juxtaposed ones of said marginal portions and extending longitudinally from said first-mentioned to said further elongated strip member; and a strapping band overlying the outwardly directed faces of all of said members.

9. A structural element comprising a pair of spaced, substantially parallel sheets of frangible material of polygonal configuration and each having an elongated edge portion extending in direction toward the other panel and defining acute angles with the general planes of the respective sheets and marginal portions extending at an angle to and meeting said elongated edge portions, the marginal edge portion of one of said sheets being juxtaposed with corresponding marginal edge portions of the other of said sheets, and a further elongated edge portion spaced from the first-mentioned elongated edge portion; connecting means connecting said sheet members to one another and including an elongated strip member of elastic material provided with longitudinally extending channels which are complementary to said sheets and in which said edge portions are received, and a further elongated strip member of elastic material provided with longitudinally extending grooves in which said further edge portions are received, whereby said sheets are maintained in spaced position with reference to one another; and elongated sealing members of elastic material received between juxtaposed ones of said marginal portions and extending longitudinally from said first-mentioned to said further elongated strip member; and a strapping band overlying the outwardly directed faces of all of said members.

References Cited
UNITED STATES PATENTS

| | | | |
|---|---|---|---|
| 2,057,823 | 10/1936 | Galey | 52—616 |
| 2,741,342 | 4/1956 | Etten | 52—619 |
| 2,796,959 | 6/1957 | Toney | 52—619 |
| 2,844,848 | 7/1958 | Couse | 52—220 |

REINALDO P. MACHADO, *Primary Examiner.*